United States Patent [19]

Frost

[11] Patent Number: 4,732,247

[45] Date of Patent: Mar. 22, 1988

[54] TRIPLE CONE SYNCHRONIZER WITH SERVO ACTION

[75] Inventor: Barry L. Frost, DeWitt, N.Y.

[73] Assignee: Chrysler Motors Corporation, Highland Park, Mich.

[21] Appl. No.: 5,719

[22] Filed: Jan. 21, 1987

[51] Int. Cl.⁴ .............................................. F16D 23/06
[52] U.S. Cl. .................... 192/53 F; 192/53 R; 192/53 G
[58] Field of Search ................ 192/53 A, 53 E, 53 F, 192/53 G, 53 R; 74/339

[56] References Cited

U.S. PATENT DOCUMENTS

| | | | |
|---|---|---|---|
| 3,272,291 | 9/1966 | Flinn | 192/53 F |
| 4,185,725 | 1/1980 | Maina | 192/53 F |
| 4,445,602 | 5/1984 | Chana | 192/53 F |
| 4,620,623 | 11/1986 | Barksdale | 192/53 E |
| 4,623,054 | 11/1986 | Barksdale | 192/53 E |

FOREIGN PATENT DOCUMENTS

| | | | |
|---|---|---|---|
| 2556437 | 6/1985 | France | 192/53 R |
| 1102991 | 2/1968 | United Kingdom | 192/53 F |

Primary Examiner—Rodney H. Bonck
Assistant Examiner—David A. Testardi
Attorney, Agent, or Firm—Edward P. Barthel

[57] ABSTRACT

An improved multi-cone strutless synchronizer has one or more cone rings concentrically disposed intermediate an outer blocker ring and an inner exterior cone surface of a ratio gear journally supported on a speed shaft. The cone ring is formed with a plurality of longitudinally extending drive tangs projecting into an associated window of the ratio gear. Each drive tang is symmetrical about its longitudinal centerline defining a pair of back-angled cam edges diverging outwardly at an acute angle from the centerline. Each window has a side wall disposed in spaced parallel relation with an associated tang cam edge and adapted to be slidably engaged thereby upon the synchronizer sleeve being moved toward the ratio gear whereby the synchronizing torque is increased for a given synchronizer force.

4 Claims, 7 Drawing Figures

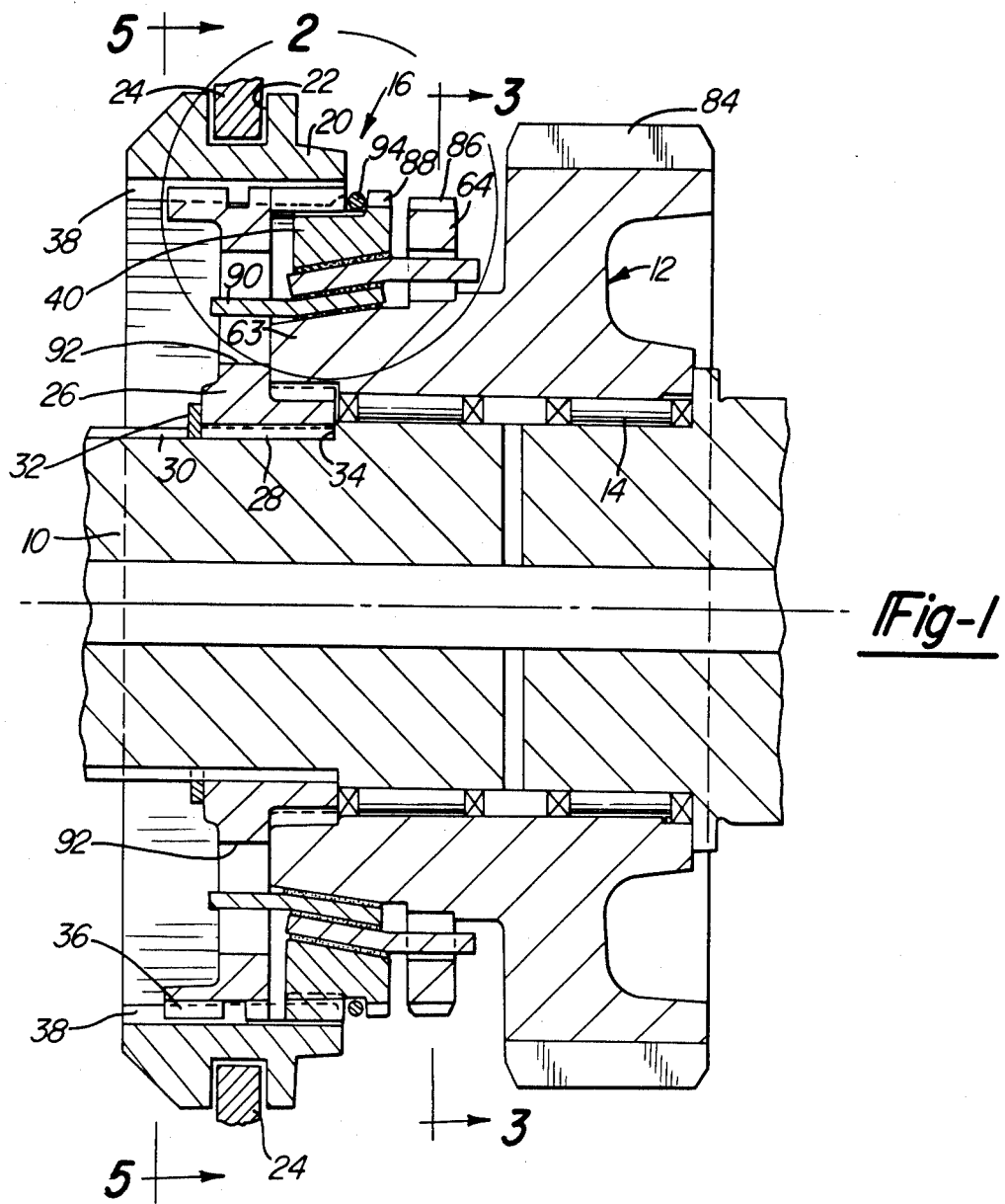
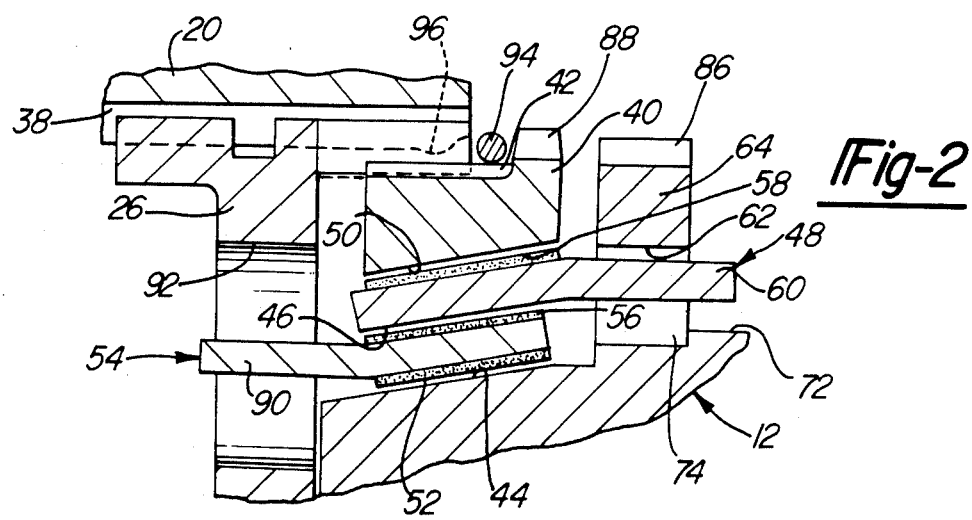

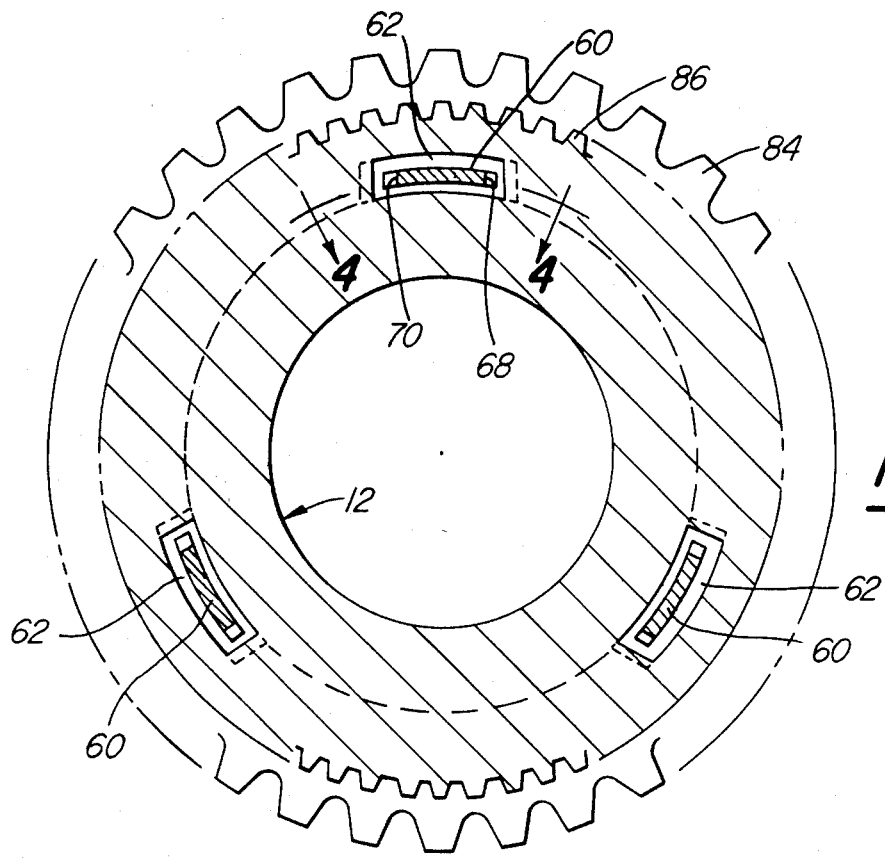
*Fig-3*
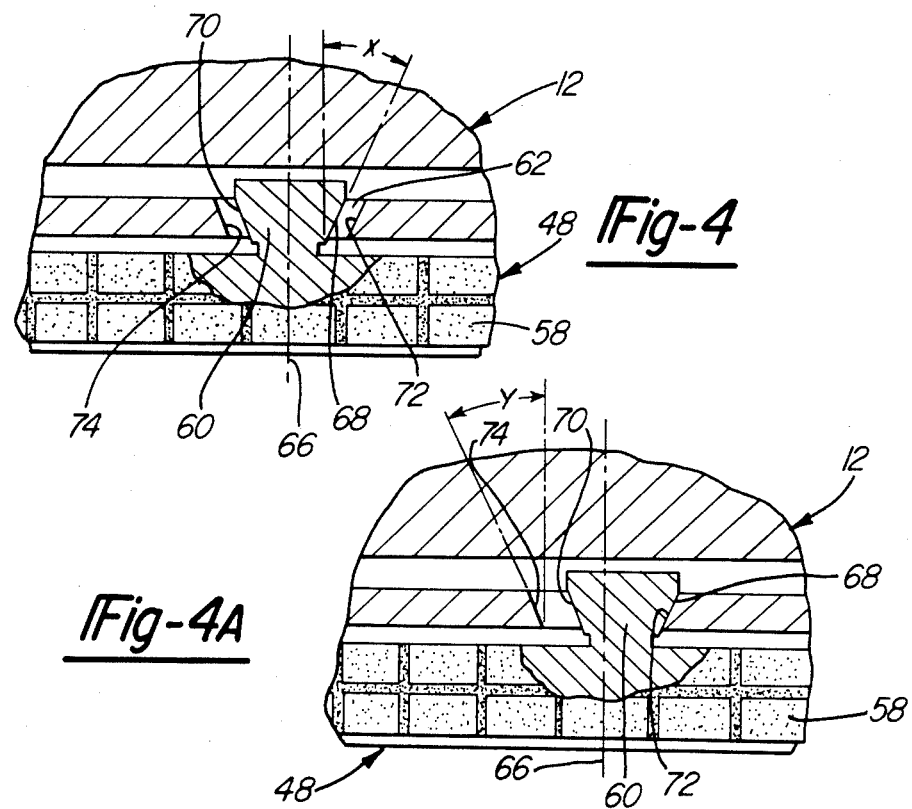
*Fig-4*
*Fig-4A*

TRIPLE CONE SYNCHRONIZER WITH SERVO ACTION

BACKGROUND OF THE INVENTION

This invention relates to multiple cone-type strutless synchronizers for manual transmissions and more particularly to an improved triple cone blocker ring strutless synchronizer incorporating servo action.

Strutless synchronizers, such as disclosed in the U.S. Pat. No. 3,700,083 issued Oct. 29, 1972 to N. Ashikawa et al, are well known in the synchromesh transmission art. The '083 patent employs an annular spring interposed between a sleeve, slidably mounted on a hub on a main shaft, and a blocker ring provided on the conical slidable surface of a speed ratio gear. The annular spring is slidably mounted in a snug manner on the outer surface of three uniformly spaced axially extending lugs integrally formed as the blocking ring. The annular spring interposed between the sleeve and the blocker ring lugs is so arranged that upon movement of the sleeve, the annular spring is first pushed axially by certain of the sleeve internal uniformly spaced splines. This in turn causes the annular spring to axially push the blocker ring. The blocker ring is then seated on the gear cone which, having a relative rotational speed, generates a cone torque to index or clock the blocker ring to the desired blocking position. Once synchronization is complete, the annular spring is then compressed and deflected radially inward by the sleeve as the sleeve passes over the spring. As a result, the sleeve internal splines mesh with a driven gear journaled on the main shaft and thus rotation of the main shaft is transmitted to the driven gear.

The U.S. Pat. No. 4,623,054 issued Nov. 18, 1986 to Barksdale discloses a dual cone pin type synchronizing clutch having multiple conical friction elements for synchronizing the speeds of a shaft and a gear wheel before clutch engagement. The '054 patent includes a cone element member rotatably supported on a gear wheel and free to rotate relative to a conical friction surface on the gear wheel. A hub is splined to the shaft and has external teeth engaged by internal teeth of the synchronizer clutch sleeve. The clutch sleeve defines blocking surfaces that contact mating blocking surfaces on a cone arm assembly. As the clutch sleeve is moved axially by the vehicle operator during gear change, the cone arm assembly is moved axially bringing the conical surface into contact with the mating friction surfaces on an intermediate cone member fixed to the gear wheel. This frictional engagement operates to synchronize the speeds of the gear wheel and the clutch hub before the sleeve is moved axially further into mechanical engagement with the clutching teeth on the gear wheel.

SUMMARY OF THE INVENTION

It is an object of this invention to provide a multiple cone synchronizing clutch for connecting a ratio gear wheel to a synchronizer hub with servo action providing increased torque capacity.

It is another object of this invention to provide a strutless synchronizing clutch having three cone surfaces mating with three friction or blocking surfaces. The first cone surface is exteriorly formed on a ratio gear rotatably supported on a transmission shaft. The second cone surface is formed on the interior of an outer cone ring while the third cone surface is formed on the interior of a blocker ring. The first blocking surface is provided on the interior of the inner cone ring and is adapted to contact the ratio gear first cone surface. The second blocking surface is defined by the exterior of the inner cone ring and it is adapted to contact the second interior surface of the outer cone ring. The third blocking surface is defined by the exterior of the outer cone ring for and is adapted to contact the interior cone surface on the blocker ring.

The outer cone ring has a plurality of forwardly projecting drive tangs each of which engages in a window formed on a radial flange of the ratio gear. Each drive tang is symmetrical about its longitudinal centerline defining identical back-angled cam edges. A cam edge of each drive tang is operative to slidably engage an opposed matching angled side wall of its associated window upon an axial shifting force being applied to the synchronizer. The inner cone ring has a plurality of rearwardly projecting locking fingers each of which engages in a hole formed in the hub radial flange.

As the clutch sleeve is moved axially forward by the vehicle operator during a gear change, an annular spring is contacted by inclined surfaces of radial teeth formed on at least three equally spaced sleeve internal splines. The annular spring is interposed between the sleeve and three raised lugs on the outer surface of the blocker ring. The annular spring is arranged so that at the time of displacement of the sleeve, the spring is initially pushed axially by the sleeve teeth thereby pushing the blocker ring forwardly. This results in the blocker ring interior cone surface being brought into frictional engagement with the exterior blocking surface of the outer cone ring. As the shaft speed increases the frictional torque developed between the blocker ring interior cone surface and the outer cone ring exterior blocking surface pulls the outer cone ring towards synchronization causing a back-angled cam edge of each drive tang to slidably engage its associated window matching angled side wall. The blocker ring interior cone surface and outer cone ring exterior blocking surface frictional torque works against each tang back-angled cam edge providing a forwardly directed axial force component causing the outer cone ring to be drawn into tighter engagement with the ratio gear. Such engagement results in an increase in the clamping force between both the remaining cone surfaces and their respective blocking surfaces thereby increasing the synchronizer torque capacity. The particular angle of the back angled cam edges chosen for the drive tangs and window side walls is determined by balancing the degree of slope of the with the coefficient of friction of the particular type of material used in the manufacture of the friction pads or lining bonded to the blocking surfaces.

Further objects and advantages of the present invention will be apparent from the following description, reference being made to the accompanying drawings wherein a preferred embodiment of the present invention is clearly shown.

BRIEF DESCRIPTION OF THE DRAWINGS

FIG. 1 is an axial longitudinal cross-sectional view of the synchronizing mechanism according to the present invention;

FIG. 2 is an enlarged fragmentary view of a portion of FIG. 1 within the circle designated 2;

FIG. 3 is an enlarged fragmentary cross-sectional view taken substantially on the line 3—3 of FIG. 1;

FIG. 4 is a fragmentary cross-sectional view, with parts broken away, taken substantially on the line 4—4 of FIG. 3;

FIG. 4A is a view similar to FIG. 4 showing the outer cone ring rotated wherein its cam fingers inclined edges are in engagement with ratio gear complementary cam surfaces;

DETAILED DESCRIPTION OF THE INVENTION

Figure 5:
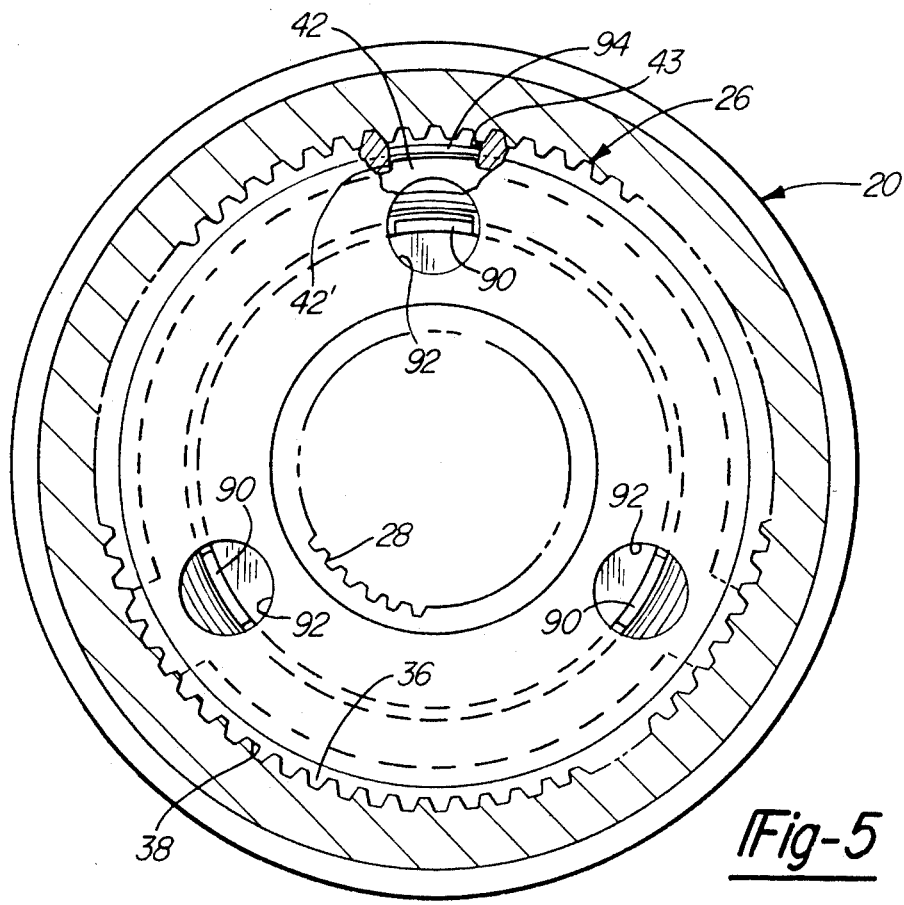
FIG. 5 is an enlarged cross-sectional view taken substantially on the line 5—5 of FIG. 1.

Referring now to the drawings, there is seen in FIG. 1 a power transfer shaft 10 on which is rotatably supported a ratio gear 12 by means of needle bearings 14. Disposed on one side of the ratio gear 12 is a synchronizer assembly generally indicated at 16 operable to cause selective speed synchronization between shaft 10 and ratio gear 12. The synchronizer assembly 16 is operated through a shift sleeve 20 which is connected by a yoke groove 22 to a conventional mechanical shift fork mechanism partially shown at 24.

The synchronizer assembly 16 includes a hub 26 fixedly connected to the shaft 10 through hub internal splines 28 engaging shaft external splines 30. A snap ring 32 positions the hub 26 on the shaft 10 in cooperation with its annular shoulder 34. As best seen in FIG. 2 the sleeve 20 is mounted on the hub 26 by means of hub external splines 36 (FIG. 1) engaging sleeve internal splines 38. Thus, the sleeve 20 is axially slidable on the hub 26 by means of the shift mechanism 24.

Figure 6:
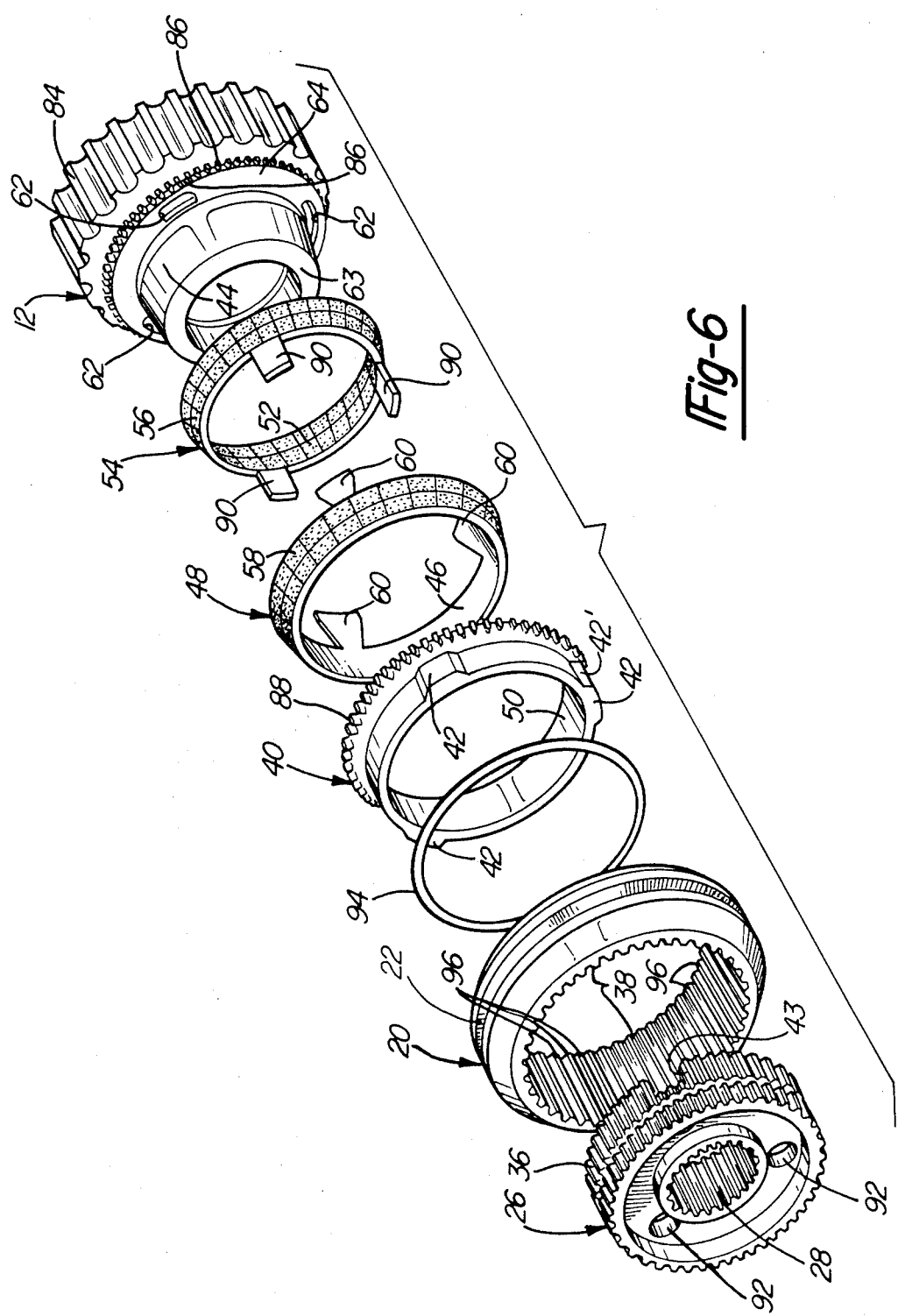
FIG. 6 is an exploded perspective view of the synchronizer mechanism shown in FIG. 1.

The synchronizer assembly 16 is a triple cone type synchronizing clutch having a blocker ring 40. As seen in FIG. 6, the blocker ring is provided with three raised lugs 42 equally spaced at 120 degree intervals around the ring 40. FIG. 5 shows lug 42 nested within its associated hub notch 43. The hub external splines 36 are interrupted at three uniformly spaced locations by notches 43 axially centered to receive associated blocker ring lugs 42 therein as indicated in FIG. 6. Thus, during indexing or clocking of the blocker ring 40 its lugs 42 have their respective side faces 42' adapted to contact an opposed face of its associated notch.

The assembly provides three cone surfaces and three mating friction blocking surfaces. As seen in FIGS. 2 and 6, the ratio gear 12 provides a first external cone surface 44. A second internal cone surface 46 is formed on the interior of outer cone ring 48. The blocker, ring 40 interior cone surface defines third internal cone surface 50. A first interior blocking surface 52 is provided on the interior of inner cone ring 54 and is adapted to contact the ratio gear exterior cone surface 44.

A second blocking surface 56 is defined by the exterior of the inner cone ring 54 which is adapted to contact the outer cone ring interior cone surface 46. A third blocking surface 58 is located on the exterior of the outer cone ring 48 and is adapted to contact the blocker ring interior cone surface 50. It will be noted that in the disclosed embodiment each of the three blocking surfaces 52, 56 and 58 is in the form of a friction pad or lining bonded or cemented to its associated metal cone ring providing effective frictional engagement. An example of one type of a friction lining that may be used with the present invention is disclosed in U.S. Pat. No. 4,267,912 issued May 29, 1981 to Bauer et al., the disclosure of which is incorporated by reference herein.

The outer cone ring 48 has three rightwardly or forwardly projecting torque drive tangs 60 formed integral therewith and uniformly spaced on 120 degree centers. Each of the torque drive tangs 60 extends forwardly parallel to the main shaft principal axis and engages in an associated window 62 formed in splined flange 64 extending radially from the ratio gear as seen in FIG. 1.

As best seen in FIG. 4 each drive tang 60 is formed symmetrical about its longitudinal axis of symmetry which axis coincides with its associated window 62 axial centerline 66 when the synchronizer is in its neutral position. The drive tang 60 defines a pair of back-angled cam edges 68 and 70. Each back-angled cam edge 68 and 70 is shown diverging outwardly from the longitudinal centerline 66 at a predetermined acute angle "X" which in the disclosed embodiment defines an angle of 23 degrees. It will be noted that window 62 is also formed symmetrical about its centerline 66 with its opposed side walls 72 and 74 each disposed at a predetermined matching acute angle "Y" (Fig. 4A) with centerline 66 equal to the angle "X". Thus, the window side wall 72 is disposed in parallel spaced relation to its associated tang cam edge 68 and the window side wall 74 is disposed in parallel spaced relation to its associated tang cam edge 70 with the synchronizer in its neutral position of FIG. 4.

As seen in FIGS. 1 and 3 the ratio gear 12 has a toothed outer diameter 84 adapted to mesh with other gear members in a well-known manner. Also, the ratio gear flange portion 64 has a toothed or splined surface 86 which is coaxial and alignable with a toothed or splined surface 88 formed on the outer circumference of synchronizer blocker ring 40. Both toothed surfaces 86 and 88 are engageable by a toothed surface defined by the shift ring internal splines 38. The splines 38 are in continual engagement with the external splines 36 formed on the hub 26.

It will be seen in FIGS. 2 and 6 that the inner cone ring 56 is formed with three axially extending uniformly spaced locking fingers 90. The locking fingers 90 extend to the left as viewed in FIG. 2, projecting into associated aligned circular openings 92 formed in hub 26.

The synchronizer assembly 16 includes an annular spring 94 mounted on blocker ring 40. The spring 94 is formed with a predetermined internal diameter such that it is slidably received on the three lugs 42 in a snug press-fit manner. The function of the spring 94 is generally set forth in U.S. Pat. No. 3,700,083 issued Oct. 24, 1972 to Askikawa et al entitled "Synchromesh Transmission Apparatus". As shown and described in the 3,700,083 patent projections in the form of radial teeth portions 96 (FIG. 2), are formed at the rightward end of three pair of the 120 degree spaced sleeve internal splines 38. of the sleeve 20.

In operation upon the sleeve 20 being shifted from its neutral position of FIG. 1, each pair of radial teeth portions 96 contact the annular spring 44. At this point the running clearances between all the axially moving parts has been taken up. Next a detent load builds up as the annular spring 94 is compressed radially by the sleeve teeth 96. The radial compression of the annular spring 94 generates initial cone torque between the blocker ring interior cone surface 50 and the outer cone ring exterior blocking surface 58. This causes the outer cone ring 48 to be drawn toward the blocker ring 40 and rotated or clocked to its indexed position wherein each drive tang back-angled edge 68 slidably engages its associated window side wall 72 thereby drawing the two remaining cone surfaces 44 and 46 into tighter engagement with their respective first and second blocking surfaces 52 and 56. This tighter engagement results in an increased synchronizing torque for a given synchronizer axial force.

With the blocker ring 40 in its indexed position the sleeve 20 now moves to a chamfer-to-chamfer loading position between the opposed faces of the exterior toothed surface 86 on the ratio gear flange and the sleeve interior toothed surface 38. When the ratio gear 12 speed relative to the blocker ring 40 and sleeve 20 approaches zero the cone torque falls to zero. Synchronization is now complete and the blocker ring is no longer energized wherein the ratio gear moves aside to pass the sleeve splines 38 and complete lockup.

It will be noted that while in the preferred embodiment the angle "X" is 23 degrees other angles may be used depending upon various factors such as the type of material used for the friction pad or lining on the blocking surfaces 52, 56 and 58. Thus, the drive tang side edges 68 and 70 angle "X" may have a range of about 18 degrees to 28 degrees without departing from the scope of the invention. It is understood that the window side walls 72 and 74 will also be formed at a matching acute angle "Y" equal to the selected angle "X".

While a specific embodiment of the invention has been shown and described in detail to illustrate the application of the principles of the invention, it will be understood that the invention may be embodied otherwise without departing from such principles.

What is claimed is:

1. In a synchronizer and gear assembly comprising; a longitudinally extending drive shaft with at least one ratio gear journally mounted on said shaft, said ratio gear formed with an external cone surface, an externally splined hub fixed on said shaft and a sleeve having internal splines slidably coupled to said hub external splines and slidable forwardly thereon to an operative position for engaging said ratio gear coupling the ratio gear in rotation with said shaft, a blocker ring having an internal cone surface disposed in a radially outward manner defining a clearance with said ratio gear external cone surface for reciprocal movement relative thereto, an annular spring between said sleeve and said blocker ring, the improvement wherein an outer cone ring is concentrically disposed in said clearance adjacent said blocker ring internal cone surface, said outer cone ring defining an external blocking surface adapted to frictionally engage said blocker ring internal cone surface, said outer cone ring defining an internal cone surface, an inner cone ring concentrically disposed in said clearance adjacent said ratio gear external cone surface, said inner cone ring defining an external blocking surface adapted to frictionally engage said outer cone ring internal cone surface, said inner cone ring defining an internal blocking surface adapted to frictionally engage said ratio gear external cone surface, said outer cone ring having a plurality of forwardly projecting drive tangs, each said drive tang projecting in an associated window in said ratio gear, each said drive tang symmetrically disposed about its longitudinal centerline defining a pair of back-angled cam edges, each said cam edge diverging outwardly from said centerline at a predetermined acute angle, each said window having a pair of symmetrically disposed side walls diverging outwardly at an acute angle equal to said predetermined acute angle each said window side wall located in spaced parallel relation to its associated opposed drive tang back-angled cam edge with said synchronizer in its neutral mode, said inner cone ring having a plurality of rearwardly projecting locking fingers, each said locking finger projecting in an associated aligned opening in said hub, whereby upon said sleeve being initially moved forwardly said annular spring presses said blocking ring internal cone surface against said outer cone ring external blocking surface, such that said outer cone ring is drawn toward said ratio gear and rotated relative thereto, wherein one of each said pair of drive tang back-angled cam edges slidably engages its opposed ratio gear window side wall, such that said ratio gear external cone surface and said outer cone ring internal cone surface are drawn into tighter engagement with said inner cone ring internal blocking surface and said inner cone ring external blocking surface respectively, whereby the synchronizing torque of said assembly is increased for a given synchronizer axial force.

2. The synchronizer and gear assembly as set forth in claim 1 wherein said outer cone ring has three drive tangs uniformly spaced at 120 degree angles.

3. The synchronizer and gear assembly as set forth in claim 1 wherein each said drive tang has its back-angled cam edges formed at a predetermined acute angle in the range of 18 to 28 degrees.

4. The synchronizer and gear assembly as set forth in claim 1 wherein each said back-angled cam edge is formed at a predetermined acute angle of about 23 degrees.

* * * * *